(12) United States Patent
Adachi et al.

(10) Patent No.: US 6,324,397 B1
(45) Date of Patent: *Nov. 27, 2001

(54) PORTABLE TERMINAL EQUIPMENT (75) Inventors: Naofumi Adachi, Saitama; Teru Saitou, Tochigi; Akira Ootake, Tochigi; Yoshihito Takeshima, Tochigi; Ryouji Terada, Tochigi, all of (JP)

(73) Assignee: Aiwa Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,267
(22) PCT Filed: Mar. 26, 1997
(86) PCT No.: PCT/JP97/01013
§ 371 Date: Mar. 15, 1999
§ 102(e) Date: Mar. 15, 1999
(87) PCT Pub. No.: WO97/36386
PCT Pub. Date: Feb. 10, 1997

(30) Foreign Application Priority Data
Mar. 27, 1996 (JP) .................................. 8-072871

(51) Int. Cl.$^7$ ........................................ H04J 3/06
(52) U.S. Cl. ....................... 455/422; 455/453; 455/515
(58) Field of Search ........................... 455/422, 423, 455/434, 453, 515, 67.3, 68

(56) References Cited

U.S. PATENT DOCUMENTS

| | | | |
|---|---|---|---|
| 4,969,205 | * 11/1990 | Itoh | 455/54 |
| 5,603,093 | * 2/1997 | Yoshimi et al. | 455/63 |
| 5,761,198 | * 6/1998 | Kojima et al. | 370/337 |
| 5,805,666 | * 9/1998 | Ishizuka et al. | 379/1 |
| 5,884,165 | * 3/1999 | Uchida et al. | 455/426 |

FOREIGN PATENT DOCUMENTS

| | | |
|---|---|---|
| 4-241528 | 8/1992 | (JP) . |
| 5-327586 | 12/1993 | (JP) . |
| 7-30478 | 1/1995 | (JP) . |

* cited by examiner

Primary Examiner—Thanh Cong Le
Assistant Examiner—Thuan T. Nguyen
(74) Attorney, Agent, or Firm—Smith-Hill and Bedell (57) ABSTRACT

This invention relates to a portable terminal equipment which receives intermittently a control channel transmitted from a cell station in a standby state. When the equipment shifts to the standby state, the equipment is brought into a receiving state to receive intermittently the control channel (PCH) for a set period of time W1 at every 1.2 seconds (ST22–ST25 and ST32). In addition, the equipment judges the receiving state from judging information of the receiving state such as the intensity of the electric field in receiving time and the presence/absence of an error in the received data (ST27 and ST33). In a power saving mode, when the equipment keeps on receiving the control channel in a good state for a set period of time while the equipment receives the control channel at every 1.2 seconds, the equipment is brought into a receiving state to receive the control channel at every 2.4 seconds (ST33–ST35). When the equipment does not receive the control channel in a good state while the equipment receives the control channel at every 2.4 seconds, the equipment shifts directly to the receiving state to receive the control channel at every 1.2 seconds (ST33 and ST32). In the standby state, when the equipment keeps on receiving the control channel in a good state, the interval between each reception of the control channel becomes longer and thus the power consumption of the equipment is saved.

6 Claims, 10 Drawing Sheets

PORTABLE TERMINAL EQUIPMENT

TECHNICAL FIELD

The present invention relates to a portable terminal equipment such as a portable telephone or the like. In details, the present invention relates to a portable terminal equipment capable of saving power consumption by controlling the interval between each reception of the control channel in a standby state on the basis of receiving state.

BACKGROUND OF THE INVENTION

In a simplified type portable telephone-such as PHS (Personal Handyphone System), in the case of out-of-synchronism with a control channel, the synchronism with the control channel is established by receiving the control channel transmitted from a cell station and then a location thereof is registered to the cell station and the telephone shifts to a standby state. In addition, in the standby state, the telephone receives intermittently the control channel and obtains the data such as the arrival of incoming call.

The cell station, however, transmits the data such as the arrival of incoming call, plural times in consideration of jamming and soon. Therefore, when the control channel is received in a good state, it has no trouble that the interval between each reception of the control channel becomes longer.

Hence, it is an object of the present invention to provide a portable terminal equipment capable of saving the power consumption by controlling the interval between each reception of the control channel on the basis of the receiving state.

DISCLOSURE OF THE INVENTION

According to the present invention, there is provided a portable terminal equipment receiving intermittently a control channel transmitted from a cell station in a standby state which comprises a receiving-state-judging means for judging whether or not said control channel is received in a good state, and a receiving control means for controlling an interval between each reception of said control channel on the basis of the result of judgment of the receiving-state-judging means. Further, said receiving control means controls the interval so that when said receiving-state-judging means judges that said control channel is kept on receiving in a good state for a predetermined period of time while said control channel is received at every first interval, said control channel is made received at every second interval that is longer than said first interval; and said receiving control means also controls the interval so that when said receiving-state-judging means judges that said control channel is not received in a good state while said control channel is received at every said second interval, said control channel is made received at every said first interval.

Said receiving-state-judging means judges whether or not said control channel is received in a good state, based on an intensity of electric field or the presence or absence of the error in the received data and so on. Further, the interval between each reception of the control channel is controlled according to the result of judgment by the receiving-state-judging means. The equipment is controlled so that when said receiving-state-judging means judges that said control channel 3 is kept on receiving in a good state for a predetermined period of time while said interval between each reception of the control channel is short, said interval is extended. The equipment is also controlled so that when said receiving-state-judging means judges that said control channel is not received in a good state while said interval between each reception of the control channel is long, said interval is shortened.

Where the interval between each reception of control channel is so controlled that said interval becomes longer, said receiving-state-judging means judges, according to this invention, that the control channel is kept on receiving in a good state for a predetermined period of time while said interval between each reception of the control channel is short. Therefore, this invention prevents the equipment from being so precipitately controlled that said interval becomes longer when the control channel is suddenly made received in a good state even though the control channel is not received in a good state on the whole.

BEST MODE FOR CARRYING OUT THE INVENTION

Figure 1:
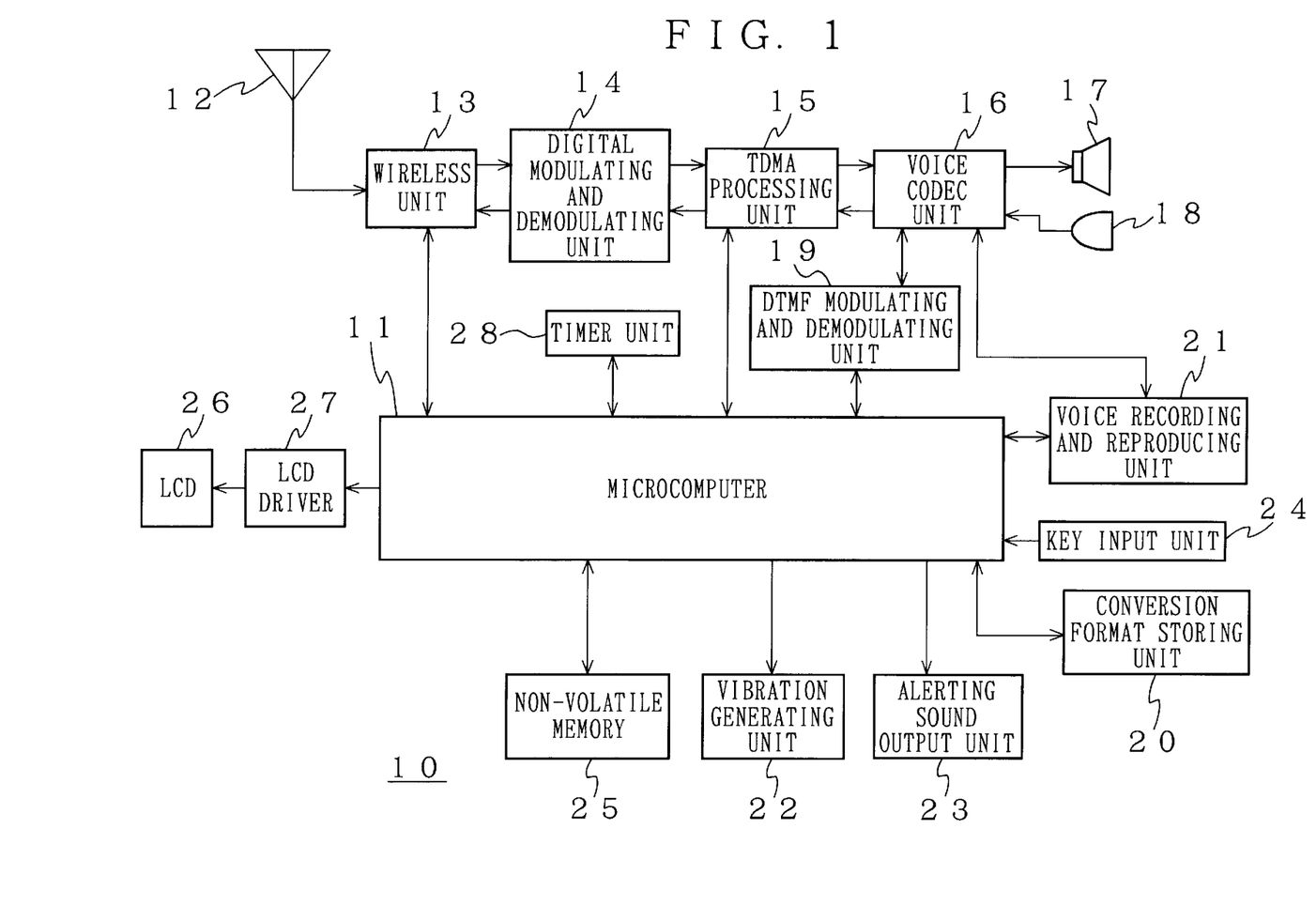
FIG. 1 is a block diagram showing the constitution of a simplified type portable telephone as a best mode of this invention.

FIG. 1 shows a simplified type portable telephone 10 according to an embodiment as the best mode of this invention. The telephone 10 uses a battery as its power source.

The telephone 10 is provided with a microcomputer 11 for controlling a system, an antenna 12 for the transmission and reception of signal, a wireless unit 13 downconverting a receiving signal at a predetermined frequency caught by the antenna 12 to provide a $\pi/4$ shift QPSK (Quadrature Phase Shift Keying) signal and upconverting a $\pi/4$ shift QPSK signal outputted from a digital modulating and demodulating unit 14, mentioned later, to provide a transmitting signal at a predetermined frequency, and the digital modulating and demodulating unit 14 demodulating the $\pi/4$ shift QPSK signal outputted from the wiring unit 13 to provide the receiving data and modulating the transmitting data outputted from a TDMA (Time Division Multiple Access) processing unit, mentioned later, to provide the $\pi/4$ shift QPSK signal.

The telephone 10 is also provided with the TDMA processing unit 15 for selecting the data of down slots which are previously set, from a receiving data (time division multiplex data in a plurality of slots) outputted from the digital modulating and demodulating unit 14, for separating the data into control data and compressed voice data and for multiplexing the compressed voice data outputted from a voice codec unit, mentioned later, and the control data outputted from the microcomputer 11 to the up slots which are previously set.

Further, the telephone 10 is provided with the voice codec unit 16 for carrying out decoding processing (including error correcting processing) in respect of the compressed voice data outputted from the TDMA processing unit 15 to provide a receiving voice signal and for carrying out compressed code forming processing (including an additional processing of the error correcting processing) in respect of a transmitting voice signal to provide the compressed voice data, a speaker (receiver) 17 for being supplied with the receiving voice signal outputted from the voice codec unit 16 and a microphone (transmitter) 18 for supplying a transmitting voice signal to the voice codec unit 16.

Additionally, the telephone 10 is provided with a DTMF modulating and demodulating unit 19 for converting a DTMF (Dual Tone Multiple Frequency) signal provided at the voice codec unit 16 as a receiving voice signal into key data in correspondence with special input keys such as "*" and "#" or ten keys of "0" through "9" to supply the data to the microcomputer 11 and for converting the key data in correspondence with special input keys such as "*" and "#" or ten keys of "0" through "9" outputted from the microcomputer 11 into the DTMF signal to supply it to the voice codec unit 16 as a transmitting voice signal, and a conversion format storing unit 20 for converting the key data outputted from the DTMF modulating and demodulating unit 19 into character data. The conversion format storing unit 20 is connected to the microcomputer 11.

Still further, the telephone 10 is provided with a voice recording and reproducing unit 21 for recording a receiving voice signal provided by the voice codec unit 16 and for reproducing a recorded receiving voice signal or a previously recorded answer message (voice signal) byoperationof a key input unit, mentioned later, or control of the microcomputer 11 in an absence recording mode, a vibration generating unit 22 for vibrating a telephone main body by control of the microcomputer 11 when a signal is received in the case where a vibration mode is set, and an alerting sound output unit 23 for outputting alerting sound by control of the microcomputer 11 when a signal is received in the case where the vibration mode is not set. In this case, the voice recording and reproducing unit 21 is provided with, for example, a semiconductor memory as a storage medium for a voice signal. Operation of the voice recording and reproducing unit 21 is controlled by the microcomputer 11 and a signal indicating the operational state of the voice recording and reproducing unit 21 is supplied from the unit 21 to the microcomputer 11.

Further, the telephone 10 is provided with the key input unit 24 arranged with a speaking key for instructing an outgoing call or for responding when an incoming call is arrived, a speech termination key for terminating speech, a function key for shifting to a telephone book registering mode and for setting an absence recording mode, a vibration mode or a power saving mode and so on, ten keys and special input keys for inputting a telephone number or the like and a recording key, a reproducing key and a sound volume key so on each of which is provided for operating the recording and reproducing of the voice recording and reproducing unit 21. The key input unit 24 is connected to the microcomputer 11 and key operation of the key input unit 24 is monitored by the microcomputer 11.

Further, the telephone 10 is provided with a non-volatile memory 25 for storing telephone book data, redial data, character message data transmitted from the called party, mode setting information and so on, a timer unit 28 for counting a time period from an arbitrary time point by control of the microcomputer 11 and a liquid crystal display (LCD: Liquid Crystal Display) 26 for displaying a state of a system, the telephone number of the called party in calling and character message transmitted from the called party and so on. The liquid crystal display 26 is driven by an LCD driver 27 controlled by the microcomputer 11.

Figure 2:
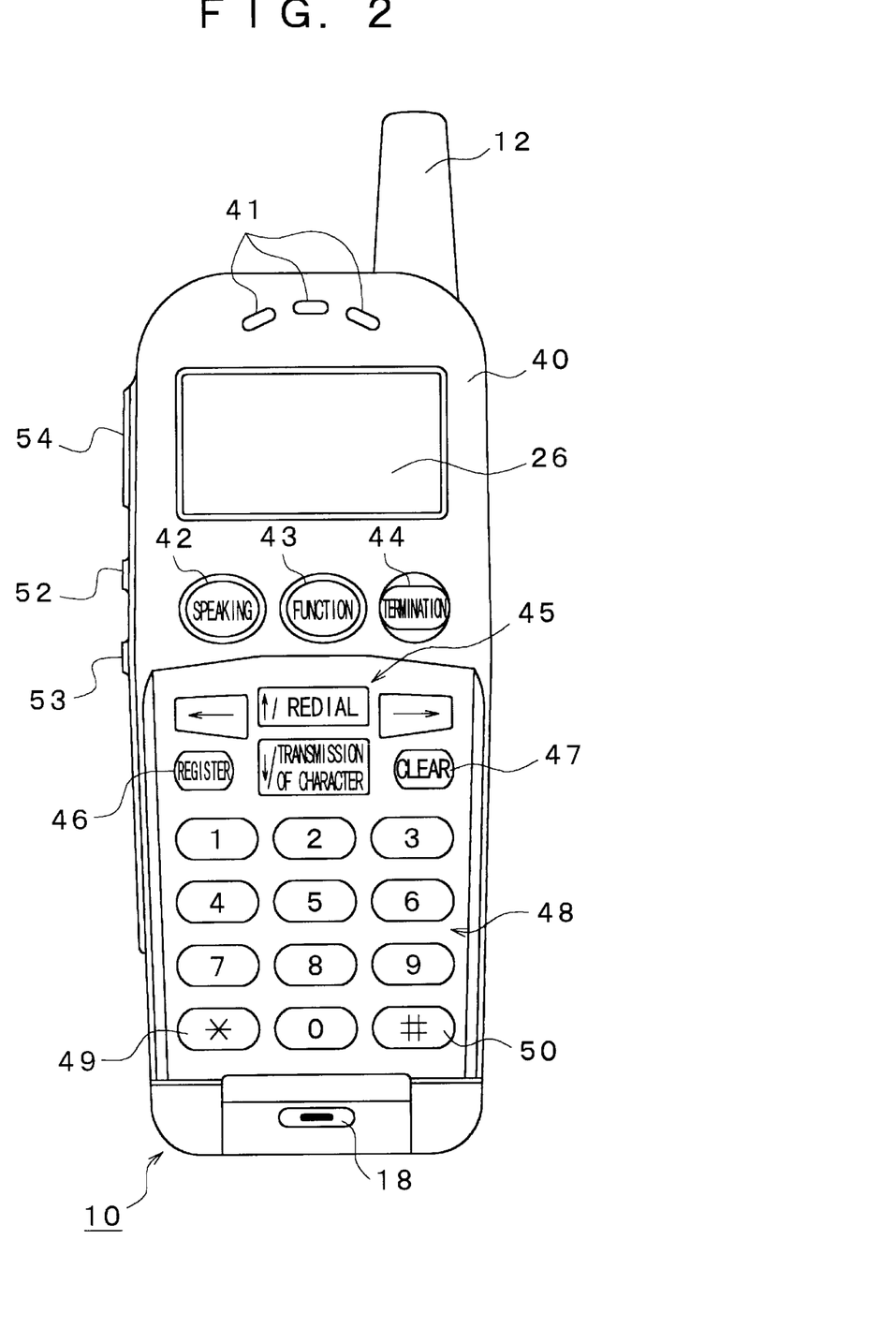
FIG. 2 is a front view showing the simplified type portable telephone (where a key-protecting lid is detached).
Figure 3:
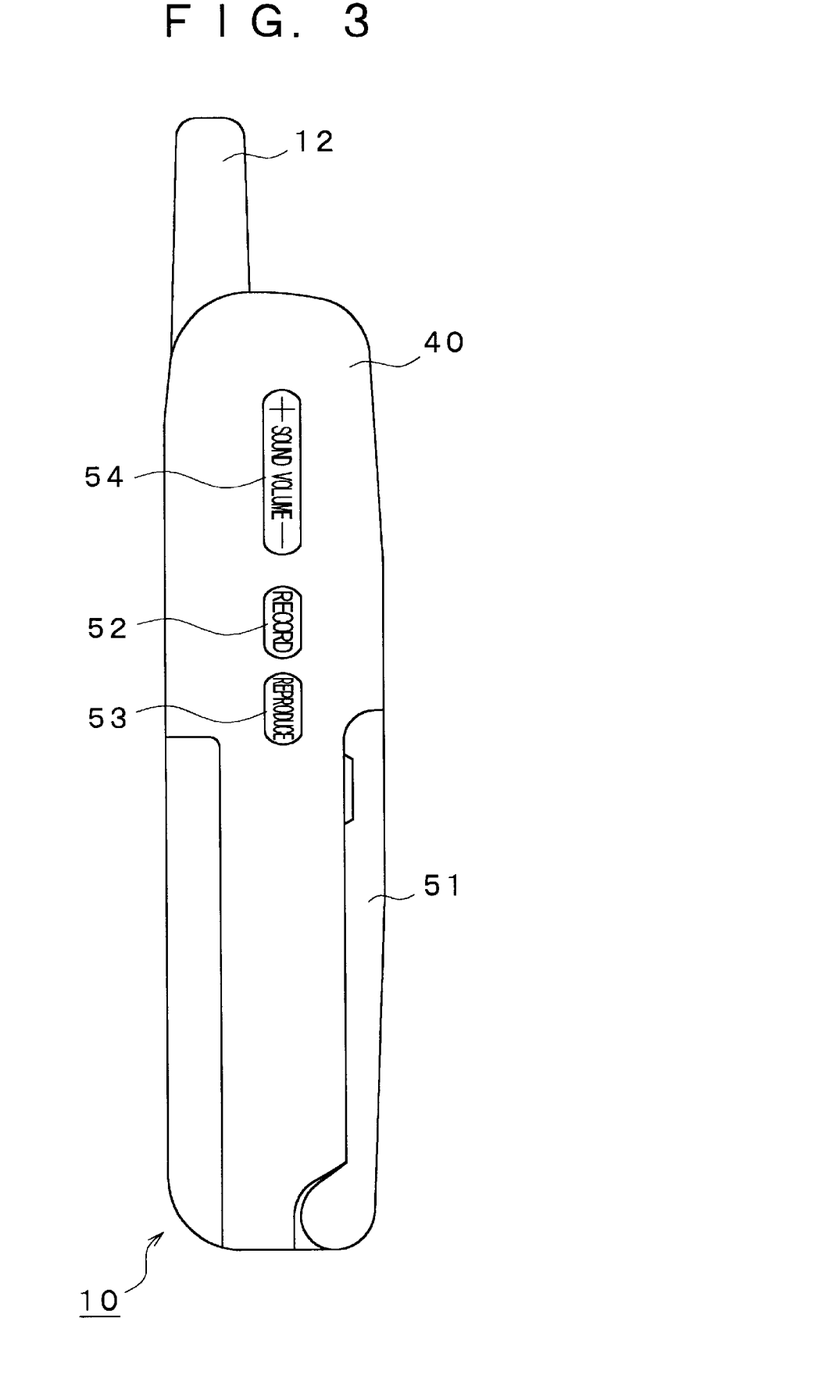
FIG. 3 is a side view showing the simplified type portable telephone.

FIG. 2 and FIG. 3 show the outlook of the telephone 10 and the same notations attaching thereto show portions in correspondence with those in FIG. 1.

The antenna 12 is arranged at the upper end portion of a telephone main body 40. Further, voice passing holes 41 for leading out voice from a built-in speaker to outside is formed at an upper portion of the main body 40 and the liquid crystal display 26 is arranged thereunder. Further, the microphone 18 is arranged at a lower portion of the main body 40. Further, a speaking key 42, a function key 43 and a speech termination key 44 are arranged to align laterally at a central portion of the main body 40 and on the lower side of the liquid crystal display 26. The termination key 44 constitutes a power ON/OFF key when it is pushed for a long period of time.

Additionally, cursor moving keys 45 for moving the cursor up and down to right and left, a registration key 46 for registering a telephone book, a clear key 47 for clearing input data, ten keys 48 and special input keys 49 and 50 are arranged on the lower side of the keys 42 through 44. In this case, "↑" key constituting the cursor moving key 45 serves also as a key for initiating the search of redial data or telephone book data and "↓" key serves also as a key for shifting to a character transmitting mode during a telephone communication and for confirming the received character data.

Further, the main body 40 is arranged with a key-protecting lid 51, which is constituted openably and closably with a portion of arranging the microphone 18 as a fulcrum. By closing the key-protecting lid 51, the keys 45 through 50 are covered. Therefore, it is necessary to operate the keys 45 through 50 in a state where the key-protecting lid 51 is opened. Incidentally, FIG. 2 shows a telephone in a state where the key-protecting lid 51 is removed.

Further, a recording key 52 and a reproducing key 53 each of which is provided for operating recording and reproducing of the voice recording and reproducing unit 21 (see FIG. 1) and a sound volume adjusting key 54 for adjusting sound volume, are arranged at a side face of the main body 40. The sound volume adjusting key 54 is constituted such that when + side thereof is operated to push, the sound volume is increased and conversely, when − side is operated to push, the sound volume is reduced.

Next, an explanation will be given of the operation of the telephone 10 shown by FIG. 1.

When the power source is made ON, the telephone is brought to a state where the synchronism with a control channel is made off and accordingly, establishment of synchronism with the control channel is carried out after receiving the control channel transmitted from a cell station. Further, thereafter, location registration indicating that the telephone stays within the service area of the service station, is carried out. The location registration is carried out by using a speaking channel. After finishing the location registration, the telephone returns to the receiving state of control channel and is brought into a standby state.

Figure 4:
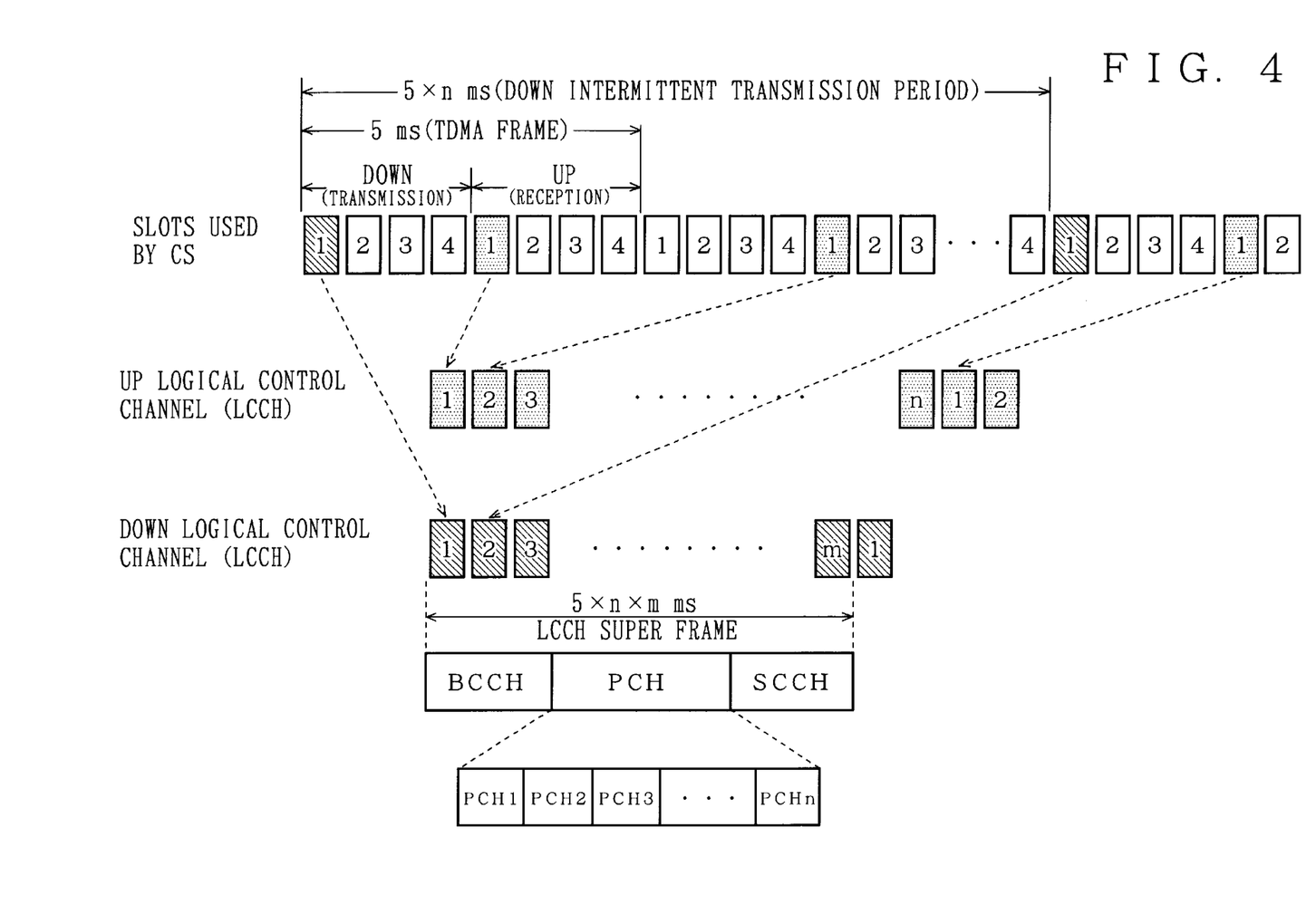
FIG. 4 is a diagram showing the constitution of a logical control channel (LCCH).

FIG. 4 shows an example of the constitution of a logical control channel (LCCH). Incidentally, this is an example in which a first slot of a TDMA frame is allocated to the logical control channel (LCCH) and an LCCH super frame is constituted by m of intermittently transmitted frames at every nTDMA frames.

According to slots to be used by a cell station (CS), a TDMA frame of 5 [ms] is constituted by 4 slots of down (transmission) and 4 slots of up (reception) successive thereto. Further, slots constituting a down logical control channel (LCCH) are present at every nTDMA frame. That is, a down intermittent transmitting period is 5×n [ms].

Further, a minimum period (5×n ×m [ms]) of a down logical control channel (LCCH) designating slot positions of all of LCCH elements is defined as an LCCH super frame. The down logical control channel (LCCH) is constituted by a broadcast control channel (BCCH), a paging channel (PCH) and a signaling control channel (SCCH). BCCH is transmitted at front slots of the LCCH super frame and a position of a front of LCCH super frame is informed by transmitting BCCH. In the meantime, an up logical control channel (LCCH) is constituted by a signaling control channel (SCCH). A position of a slot in the up logical control channel (LCCH) is informed from the cell station (CS) to a personal station (PS) by information elements constituting a carrier for control in a message for the broadcast information of wireless channel on BCCH.

Figure 5:
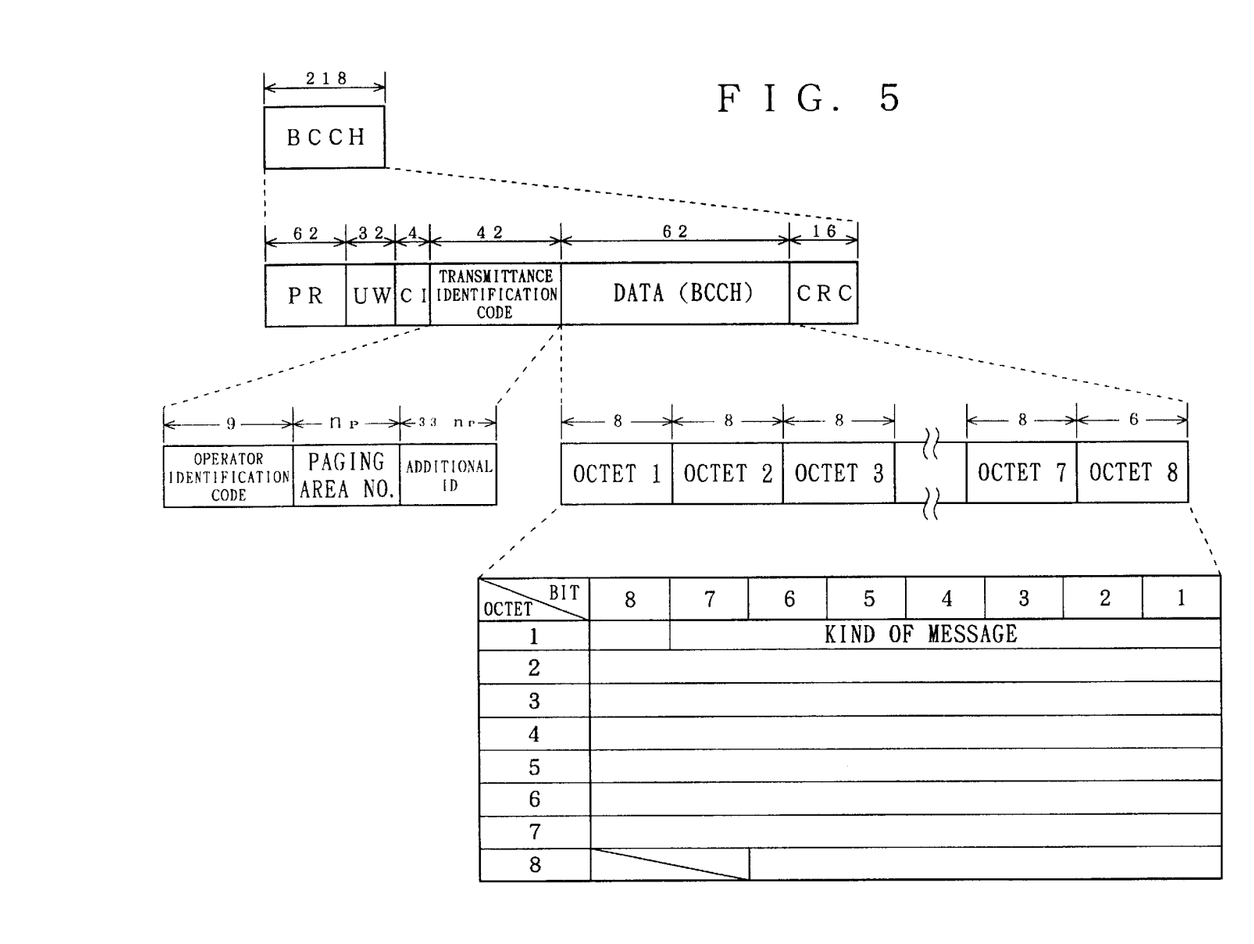
FIG. 5 is a diagram showing the constitution of BCCH.

FIG. 5 shows the constitution of BCCH. BCCH is a down uni-directional channel for informing broadcast control information from CS to PS. Information related to channel structure, system information and so on is transmitted by BCCH.

BCCH is constituted by a preamble pattern (PR), a unique word for synchronization (UW), a channel identifier (CI), a transmission identification code, data (BCCH) and a cyclic redundancy check (CRC). Further, the transmission identification code is constituted by an operator identification code, a paging area number and an additional ID. Further, data (BCCH) is constituted by octet 1 through octet 8. Further, kind of message by octet 2 through octet 8 is shown by lower 7 bits of octet 1.

Figure 6:
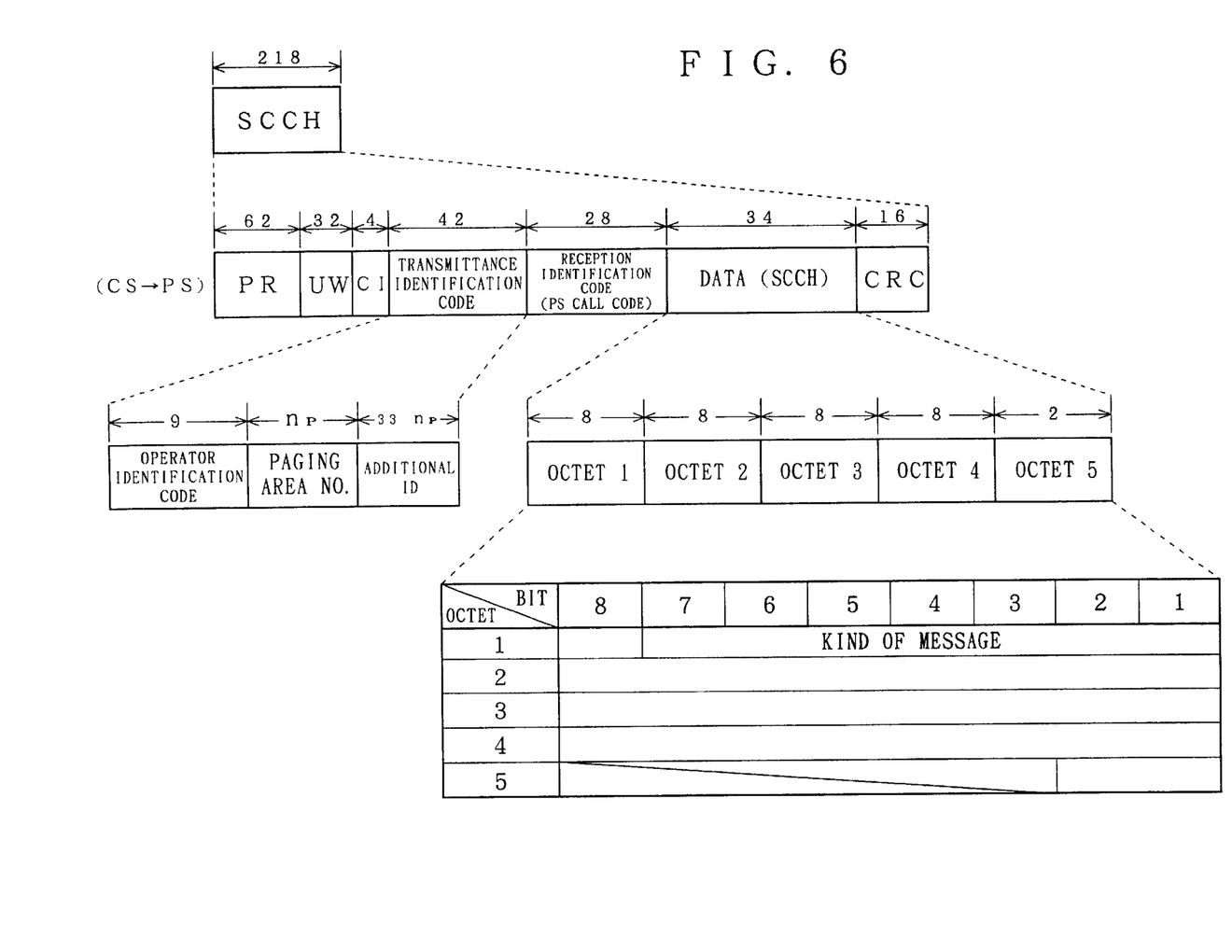
FIG. 6 is adiagram showing the constitution of SCCH.

FIG. 6 shows the constitution of SCCH. SCCH is a point-to-point bi-directional channel for transmitting information necessary for connecting call between CS and PS. According to SCCH, independent information is transmitted to each cell.

SCCH is constituted by a preamble pattern (PR), a unique word for synchronization (UW), a channel identifier (CI), a transmission identification code, a reception identification code, data (SCCH) and a cyclic redundancy check (CRC). Further, according to SCCH (down), the transmission identification code is constituted by an operator identification code, a paging area number and an additional ID and the reception identification code is constituted by a PS identification (PS-ID). Although not illustrated, according to SCCH (up), the transmission identification code mentioned above is constituted as the reception identification code and the reception identification code mentioned above is constituted as the transmission identification code. Data (SCCH) is constituted by octet 1 through octet 5. Further, kind of message by octet 2 through octet 5 is shown by lower 7 bits of octet 1.

PCH is a down uni-directional channel of point-to-multi-points for paging the same information from CS to PSs over a wide area (paging area) composed of a single cell and/or a pluralityof cells. ByPCH, CS informs to PS that call is-present. As shown by FIG. 4, a plurality of number of PCHs (PCH1 through PCHn) is present in the LCCH super frame.

Figure 7:
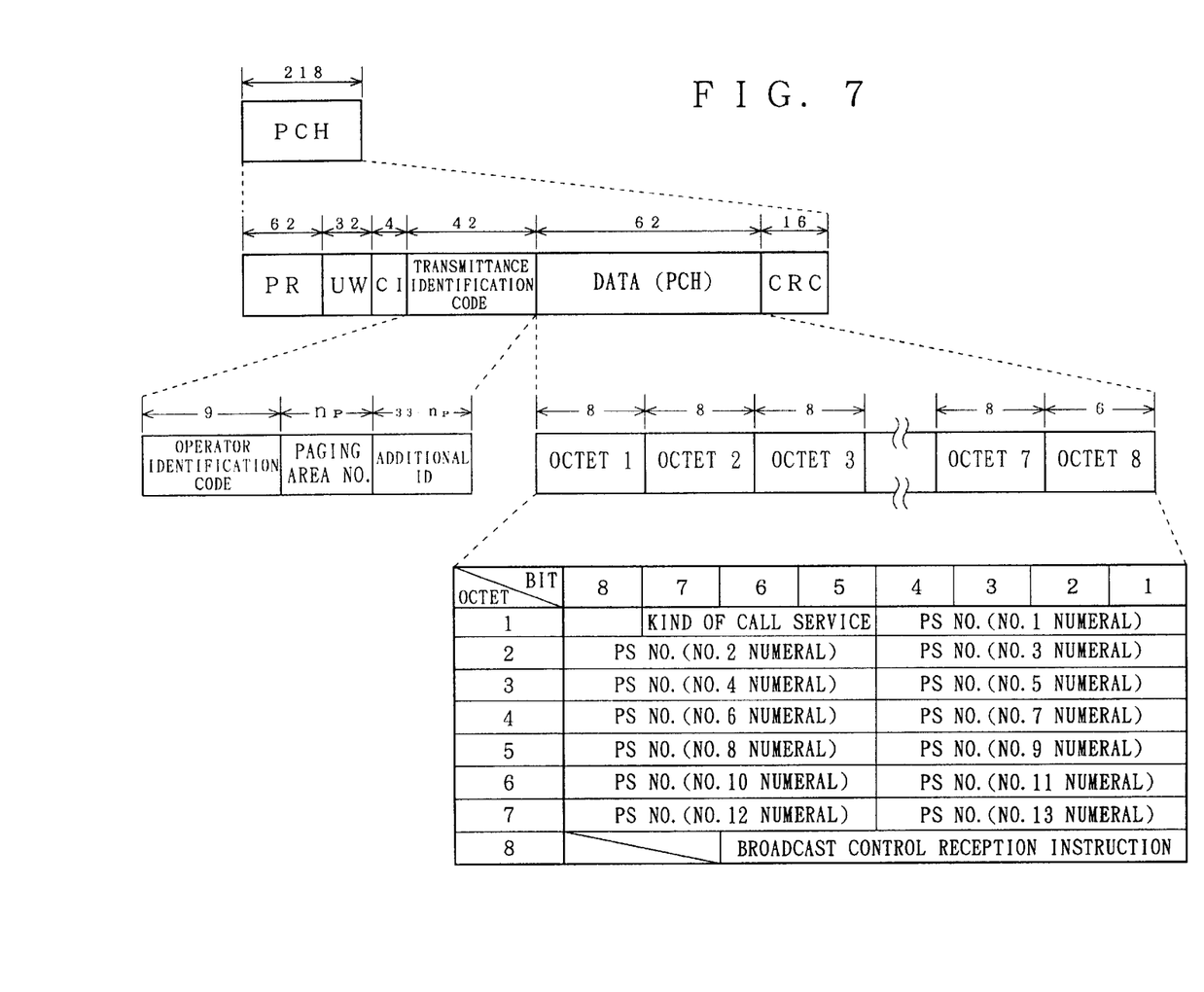
FIG. 7 is a diagram showing the constitution of PCH.

FIG. 7 shows the constitution of PCH. PCH is constituted by a preamble pattern (PR), a unique word for synchronization (UW), a channel identifier (CI), a transmission identification code, data (PCH) and a cyclic redundancy check (CRC). Further, the transmission identification code is constituted by an operator identification code, a paging area number and an additional ID. Further, the data (PCH) is constituted by octet 1 through octet 8.

In this case, PCH defines only a single message and therefore, PCH is not provided with an area indicating kind of message. Kind of call service such as no call, a call service by a PS number indicated by a thirteenth digit or lower of BCD, call service by a PS number of hexadecimal seven digit or the like is displayed by 5 through 7 bits of octet 1. Further, the PS number is shown by octets 1 through 7. Further, reception instruction of a broadcast control channel (BCCH) is carried out by octet 8. When there causes a change in an intermittent reception, mentioned later, PS receives BCCH by the reception instruction.

Further, PS recognizes PCH to be received from a plurality of PCHs (PCH1 through PCHn) by a reception signal group number. In respect of PS, the reception signal group number is calculated by Equation (1) based on PS number and content of BCCH from CS ($n_{PCH}$, $n_{GROUP}$, constitution of a carrier for control). In this equation, notation $n_{PCH}$ designates a number of same reception signal group and notation $n_{GROUP}$ designates a reception signal group factor. Further, when two frequencies (2LCCH) are used and the reception groups of PCH relate to each other, X=2 and otherwise X=1.

$$\text{Reception signal group number} = (\text{PS No.}) \text{MOD}(n_{PCH} \times n_{GROUP} \times X) + 1 \qquad (1)$$

As described above, after finishing location registration, the system returns to its control channel receiving state and is brought into a standby state. In the standby state, the telephone (PS) 10 is shifted to intermittent receiving in which only PCH in correspondence with the calculated reception signal group number is received. In this case, PCH in correspondence with the calculated reception signal group number is present at every LCCH super frame and accordingly, intermittent receiving at every 1.2 seconds is formerly constituted in the standby state.

As described before, the cell station, however, transmits the data such as the arrival of incoming call, plural times in consideration of jamming and so on. Therefore, when the control channel is received in a good state, it has no trouble that the interval between each reception of the control channel becomes longer.

Figure 8:
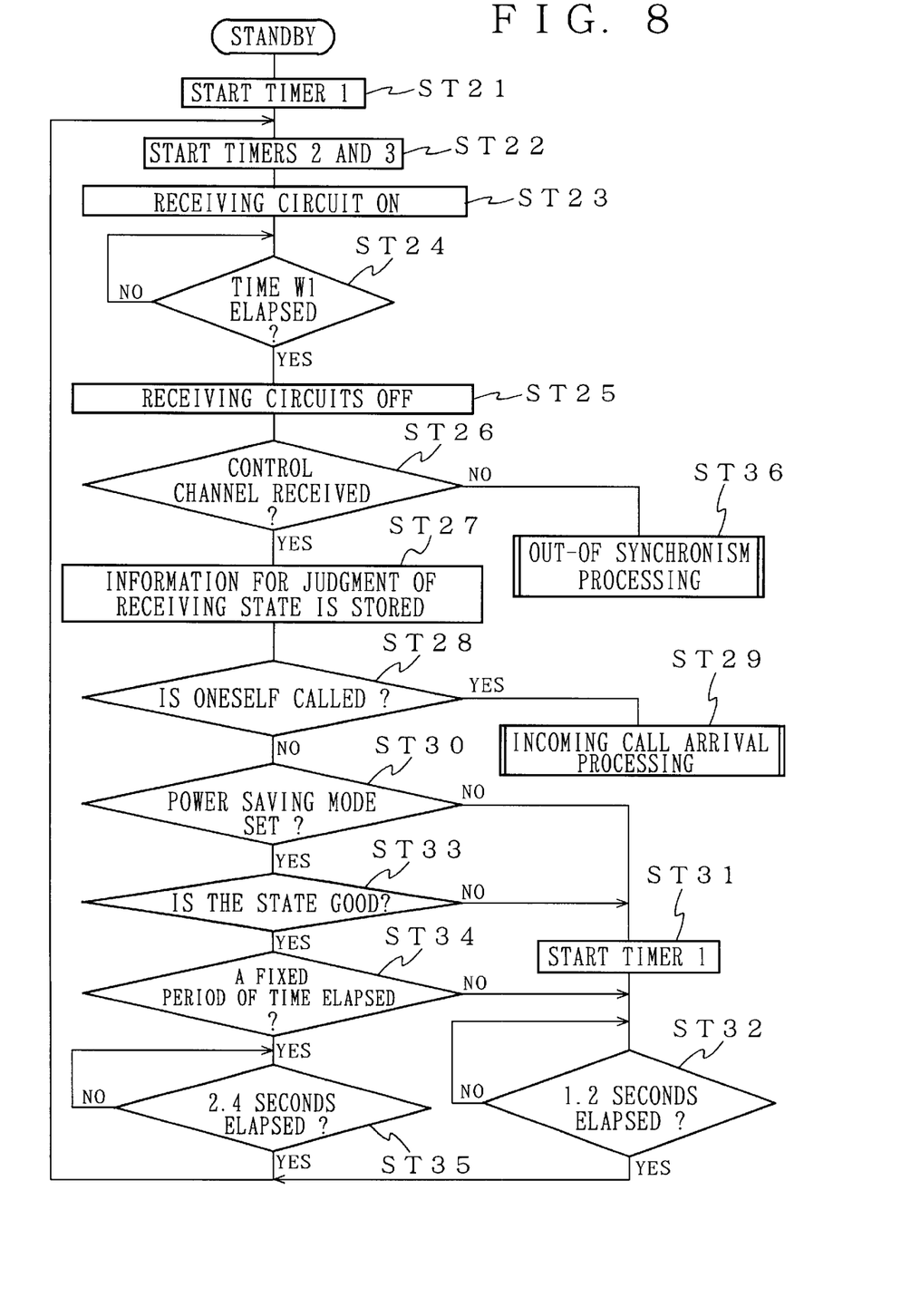
FIG. 8 is a flowchart showing an example for controlling the interval between each reception of the control channel in the standby state of the telephone.

In this embodiment, the microcomputer 11 controls the interval between each reception of the control channel in accordance with a flowchart shown by FIG.8.

When the telephone shifts to the standby state, the telephone is timed to the reception timing of PCH of the reception signal number calculated the above. Firstly, at step ST21, the timer 1 is started and, at step ST22, the timers 2 and 3 are also started. In this case, each of the timers 1 through 3 is constituted by the timer unit 28 and they are reset at starting operation.

Next, at step ST23, receiving circuits such as the wireless unit 13, the digital modulating and demodulating unit 14, the TDMA processing unit 15 are brought into an ON state. Further, at step ST24, it is determined whether time period W1 has elapsed referring to the timer 2. In this case, the time period W1 is a time period for recieving control channel at each time in the intermittent reception and is set to, for example, 48 ms. When the time period W1 has elapsed, at step 25, the receiving circuits are brought into an OFF state. Further, at step ST26, it is determined whether or not the control channel (PCH) has been received from the cell station while the receiving circuits stay on the ON state.

At step ST26, when the control channel (PCH) is received, at step ST27, the information for the judgment of receiving state is stored in the built-in memory. As the information for the judgment of receiving state, the information such as the intensity of electric field on the occasion of receiving the control channel (PCH), the presence or absence of an error in the received data and so on, is exemplified.

Next, at step ST28, it is determined whether or not the PS number of PCH is mine. When said PS number is mine, at step ST29, the processing of the arrival of incoming call is carried out. When said PS number is not mine, at step ST30, it is determined whether or not the power saving mode is set. When the power saving mode is not set, at step ST31, the timer 1 is started and the operation proceeds to step ST32.

When, at step ST30, the power saving mode is set, at step ST27, it is determined whether or not the control channel is received in a good state on the basis of the information for the judgment of receiving state, which has been stored in the build-in memory at step ST27. When the good receiving state of the control channel is determined by the information such that the intensity of electric field is high and there is no error in the received data, at step ST34, it is determined whether or not a predetermined period of time has elapsed referring to the timer 1. When the predetermined period of time has not elapsed, the operation proceeds to the step ST32. When, at step ST33, the good receiving state is not determined, at step ST31, the timer 1 is started and then the operation proceeds to the step ST32.

At the step ST32, it is determined whether or not 1.2 seconds have elapsed referring to the timer 3. When 1.2 seconds have elapsed, the operation returns to the step ST22 in which the receiving circuits are brought into ON state, and then the operations described above are repeated.

When, at step ST34, the predetermined period of time has elapsed, at step ST35, it is determined 2.4 seconds have elapsed. When 2.4 seconds have elapsed, the operation returns to the step ST22 and the timers 2 and 3 are started, and then the operations described above are repeated.

When, at step ST26, the control channel (PCH) is not received from the cell station while the receiving circuits stay on the ON state, out-of-synchronism with the control channel is judged and then, at step ST36, the processing of out-of-synchronism is carried out.

When the power savingmode is not set like this, the control channel (PCH) is received at every 1.2 seconds in spite of the receiving state. Alternatively, in case where the power saving mode is set, when the control channel is kept on receiving in a good state for a predetermined period of time while said control channel is received at every 1.2 seconds, said control channel is made received at every 2.4 seconds. Further, when the control channel is not received in a good state while said control channel is received at every 2.4 seconds, said control channel is promptly made received at every 1.2 seconds.

Therefore, when the control channel is kept on receiving in a good state in the standby state of the telephone, the interval between each reception of the control channel becomes longer and thus the power consumption is saved and the consumption of a battery can be prevented.

Where the interval between each reception of control channel is so controlled that said interval becomes longer, said receiving-state-judging means judges, according to this invention, that the control channel is kept on receiving in a good state for a predetermined period of time while said interval is short. Therefore, according to this invention, such a precipitate control that said interval becomes longer when the control channel is suddenly made received in a good state even though the control channel is not received in a good state on the whole, does not occur.

Figure 9:
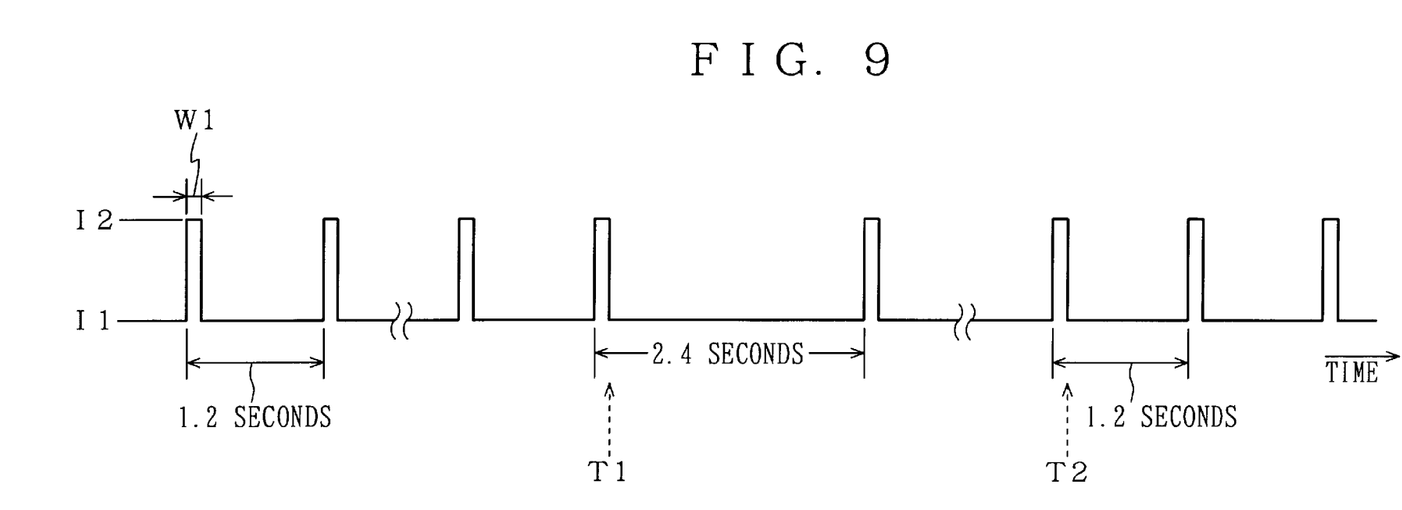
FIG. 9 illustrates a drawing showing waveform of consumed current in a standby state of the telephone.

FIG. 9 shows waveform of consumed current in the operation by the flowchart of FIG. 8. In this case, the notation T1 designates the time when it is judged that the control channel is kept on receiving in a good state for a predetermined period of time while said control channel is received at every 1.2 seconds. The notation T2 designates the time when it is judged that the control channel is not received in a good state while said control channel is received at every 2.4 seconds. In this case, the consumed current is I1 (for example, 4 ma) when the receiving circuits stay on the OFF state and the consumed current is I2 (for example, 180 ma) when the receiving circuits stay on the ON state.

Figure 10:
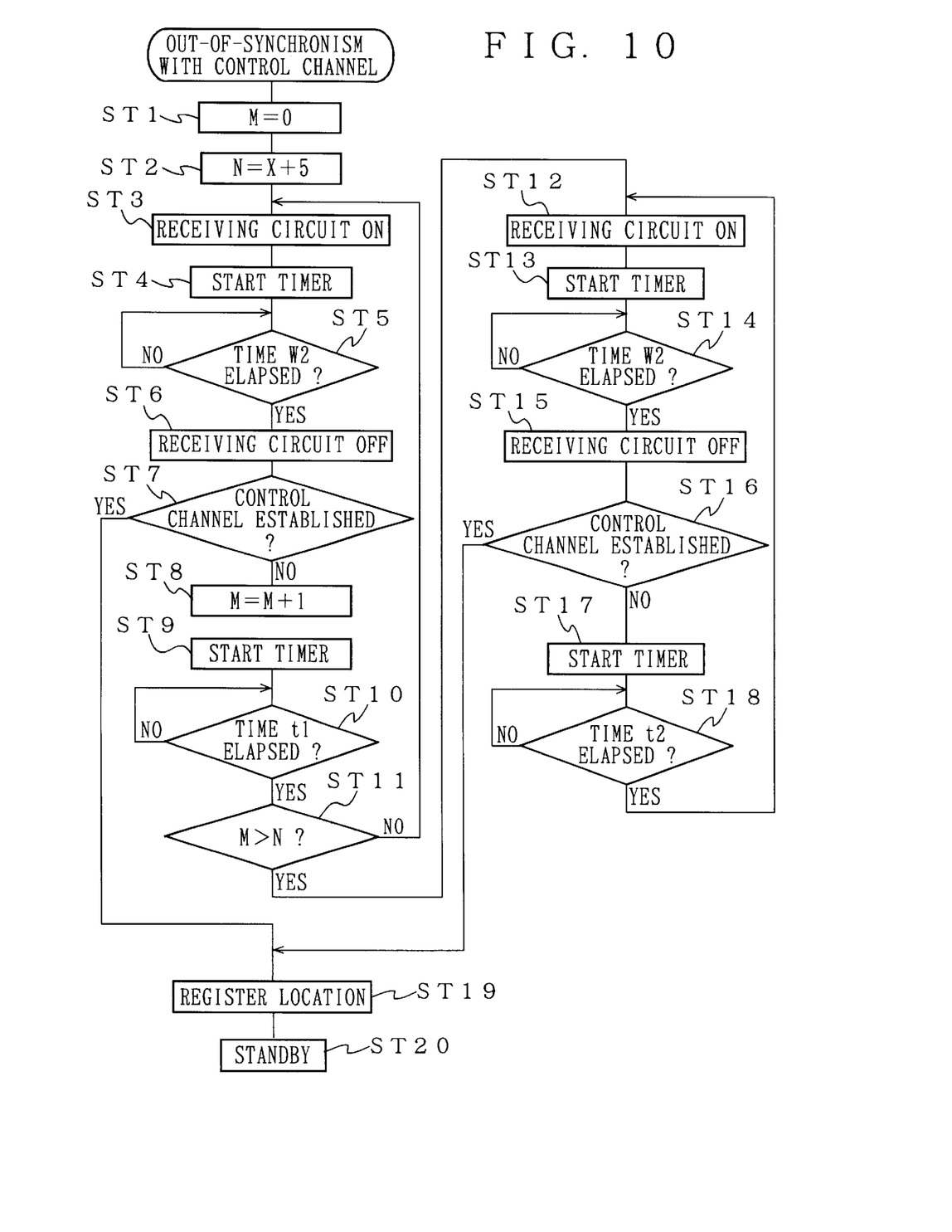
FIG. 10 a flowchart showing other example for controlling said interval in the case where synchronism with the control channel is made off.

The microcomputer 11 controls the processing of out-of-synchronism at step ST36 in accordance with a flowchart shown by FIG. 10.

First, at step ST1, M=0 is set and at step ST2, N=X+5 is set. Notation M designates a number of bringing about the control channel receiving state in order to establish the synchronism with the control channel (i.e., number of retrial) and notation X designates a number of out-of-synchronism during past one hour. Next, at step ST3, receiving circuits such as the wireless unit 13, the digital modulating and demodulating unit 14, the TDMA processing unit 15 are brought into an ON state and at step ST4, a timer is started. In this case, the timer is constituted by the timer unit 28 and is reset in starting operation.

Next, at step ST5, it is determined whether a time period W2 has elapsed. In this case, the time period W2 is a reception time period to receiving control chanel at each time in the intermittent reception in the case of out-of-synchronism and is set to, for example, 220 ms. When the time period W2 has elapsed, at step ST6, the receiving circuits are brought into an OFF state. Further, at step ST7, it is determined whether the synchronismwith the control channel has been established by receiving the control channel from the cell station while the receiving circuits stay on the ON state.

When, at step ST7, it is determined that the synchronism with the control channel has not been established, at step ST8, M is incremented and, at step ST9, a timer is started. Further, at step ST10, it is determined whether a time period t1 has elapsed. The time period t1 is an interval between each reception of the control channel and, according to the embodiment, is set to, for example, 6 seconds. At step ST11, it is determined whether M>N is determined where the time period t1 has elapsed.

When M>N is not established in step ST11, the operation returns to step ST3 and then the receiving circuits are brought into the ON state and the operations as described above are repeated. When M>N at step ST11, at step ST12, the receiving circuits are brought into the ON state and then, at step ST13, a timer is started.

Next, at step ST14, it is determined whether the time period W2 has elapsed. When the time period W2 has elapsed, at step ST15, the receiving circuits are brought into the OFF state. Further, at step ST16, it is determined whether the synchronism with the control channel has been established by receiving the control channel from cell station while the receiving circuits stay on the ON state. When, at step ST16, it is determined that the synchronism with the control channel has not been established, at step ST17, a timer is started.

Next, at step ST18, it is determined whether a time period t2 has elapsed. The time period t2 is an interval between each reception of control channel and, according to the embodiment, it is set to, for example, 30 seconds. When the time period t2 has elapsed, the operation returns to the step ST12 and the receiving circuits are brought into the ON state and then the operations as described above are repeated.

Further, when, at step ST7, the control channel has been established, at step ST19, the location is registered and, at step ST20, the system shifts to the standby state.

According to the operation by the flowchart of FIG. 10, the more frequently a user moves, the larger the number X of out-of-synchronism becomes and accordingly, N becomes larger by that amount and a period of time until the interval t1 (6 seconds) between each reception of control channel is changed to the interval t2 (30 seconds), is prolonged.

Therefore, where a user moves frequently and moves back highly probably into the service area of the cell station even if the user moves outside of the service area of the cell station, the receiving state of control channel is frequently brought about and where the user moves back into the service area of the cell station, the establishment of the synchronism with the control channel is swiftly carried out. In the meantime, where the user moves infrequently, and a possibility where the user moves back into the service area of the cell station again after moving outside of the service area of the cell station, is low, the frequency of bringing about the receiving state of control channel is lowered and thus emphasis is put on preventing a battery from its consumption. Accordingly, consumption of a battery can be prevented in compliance with situation of moving of a user.

Further, according to the telephone 10 shown by FIG. 1, when telephone number of called party is inputted by key operation at the key input unit 24 (ten keys 48 or the like), or the speaking key 42 is operated after searching redial data or telephone book data, firstly, telephone number data or the like are supplied to the TDMA processing unit 15 as control data by the microcomputer 11 and are transmitted to the cell station via the control channel. Thereby, telephone communication is made to the called party and a speaking state is brought about.

In this case, although telephone communication is carried out by using the speaking channel, in processing the connection, the communication frequency data of the speaking channel and the data relating to the slot positions each of which are transmitted as control data from the cell station by using the control channel, are supplied to the microcomputer 11 via the TDMA processing unit 15. The microcomputer 11 makes the transmission and reception frequency coincide with the communication frequency of the speaking channel by controlling the wireless unit 13 based on the communication frequency data and sets slots selected by the TDMA processing unit 15 on the basis of the slot position data. Accordingly, telephone communication is carried out by using the speaking channel informed from the cell station.

Further, in the case that call data is supplied to the microcomputer 11 via the TDMA processing unit 15 and the arrival of incoming call is detected when the call data is transmitted as control data from the cell station by using the control channel, the alerting sound output unit 23 is controlled by the microcomputer 11 and thus the alerting sound is outputted thereby. Alternatively, the telephone main body 40 is vibrated by controlling the vibration-generating unit 22 by the microcomputer 11.

When the speaking key 42 is operated and a response is produced while such the call operation is being carried out, response data is supplied as control data from the microcomputer 11 to the TDMA processing unit 15 and is transmitted to the cell station via the control channel. Thereby, the connection with the called party is carried out and the speaking state is brought about. Also in this case, telephone communication is carried out by using the speaking channel informed from the cell station.

In the speaking state, compressed voice data transmitted via the speaking channel is outputted from the TDMA processing unit 15. The compressed voice data is supplied to the voice codec unit 16, subjected to a decoding processing and thereafter converted into an analog signal. Further, the received voice signal outputted from the voice codec unit 16 is supplied to the speaker 17 and voice is outputted from the speaker 17.

Further, a transmitting voice signal outputted from the microphone 18 is supplied to the voice codec unit 16, converted into a digital signal and thereafter subjected to compressed code forming processing whereby compressed voice data is formed. Further, the compressed voice data outputted from the voice codec unit 16 is supplied to the TDMA processing unit 15 and is transmitted to the called party via the speaking channel.

In this case, by operating "↓" key of the cursor moving key 45, transmission of character data can be carried out by using the ten keys 48 or the special input keys 49 and 50. In this case, DTMF signals in correspondence with the operated keys are outputted from the DTMF modulating and demodulating unit 19 and is supplied to the voice codec unit 16 as a transmitting voice signal.

Further, when the telephone is set to an absence recording mode in the case where the call data are supplied from the TDMA processing unit 15 to the microcomputer 11 and the arrival of incoming call is detected as mentioned above, a response is made automatically after outputting alerting sound for a predetermined period of time, and the speaking state is brought about. Further, after transmitting to the calling side the response message that a received voice signal will be recorded, recording of the received voice signal is started at the voice recording and reproducing unit 21.

Further, when character message data by a DTMF signal are transmitted from the called party during an absence recording or during a telephone communication, key data outputted from the DTMF modulating and demodulating unit 19 is converted into character data based on control of the microcomputer 11 in reference to the conversion format storing unit 20 and the character data is written to a character message area of the non-volatile memory 25. When the character data is written to the non-volatile memory 25 in this way, the character message of the character data is displayed on the liquid crystal display 26 and can be confirmed by operating to push "↑" key of the cursor moving key 45 for a long period of time.

Although, in the flowchart shown in FIG. 8, the control channel is made received at every 2.4 seconds when the control channel is kept on receiving for a predetermined period of time while the control channel is received at every 1.2 seconds, the control channel may be received at every n times of 1.2 seconds such as three times, four times, in stead of 2.4 seconds. Further, when the control channel is kept on receiving for a predetermined period of time, the interval between each reception of control channel may extend by degrees such as 1.2 seconds→2.4 seconds→3.6 seconds→ . . . , at every set period of time.

Further, although according to the above-described embodiments, the present invention is applied to a simplified type portable telephone, the present invention is naturally applicable similarly to other portable terminal equipment which is capable of receiving intermittently the control channel transmitted from the cell station in a standby state.

INDUSTRIAL APPLICABILITY

As described above, a portable terminal equipment according to the present invention is preferably applied to a portable terminal equipment of a simplified type portable telephone or the like, which is capable of receiving intermittently the control channel transmitted from the cell station in a standby state.

What is claimed is:

1. A portable terminal equipment receiving intermittently a control channel transmitted from a cell station in a standby state comprising:
    a receiving-state-judging means-for-judging whether or not said control channel is received in a good state; and
    a receiving control means for controlling an interval between each reception of said control channel on the basis of the result of judgment of the receiving-state-judging means;
    wherein said receiving control means controls the interval so that when said receiving-state-judging means judges that said control channel is kept on receiving in a good state for a predetermined period of time while said control channel is received at every first interval, said control channel is made received at every second interval, said second interval being longer than said first interval; and
    wherein said receiving control means controls the interval so that when said receiving-state-judging means judges that said control channel is not received in a good state while said control channel is received at every said second interval, said control channel is made received at every said first interval.

2. A portable terminal equipment according to claim 1:
    wherein said receiving control means controls the interval so that when said receiving-state-judging means judges that said control channel is not received in a good state while said control channel is received at every said second interval, said control channel is promptly made received at every said first interval.

3. A portable terminal equipment according to claim 1:
    wherein said second interval is n times said first interval, where n is an integer not less than two.

4. A portable terminal equipment according to claim 1:
    wherein said receiving-state-judging means judges said receiving state on the basis of an intensity of electric field.

5. A portable terminal equipment according to claim 1:
    wherein said receiving-state-judging means judges said receiving state on the basis of the judgment whether or not there is an error in the received data.

6. A portable terminal equipment according to claim 1 comprising:
    a setting means for setting a power saving mode;
    wherein said receiving control means controls the interval between each reception of said control channel on the basis of the result of judgment of the receiving-state-judging means when said setting means sets said power saving mode; and
    wherein said receiving control means controls the interval between each reception of said control channel so that said interval is held constant regardless of the result of judgment of the receiving-state-judging means when said setting means does not set said power saving mode.

* * * * *